July 14, 1964 S. R. LANHAM 3,140,610
BIN LEVEL INDICATOR
Filed March 21, 1962 3 Sheets-Sheet 1

INVENTOR.
SHELBY R. LANHAM
By Donald G. Dalton
Attorney

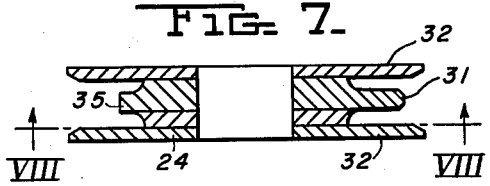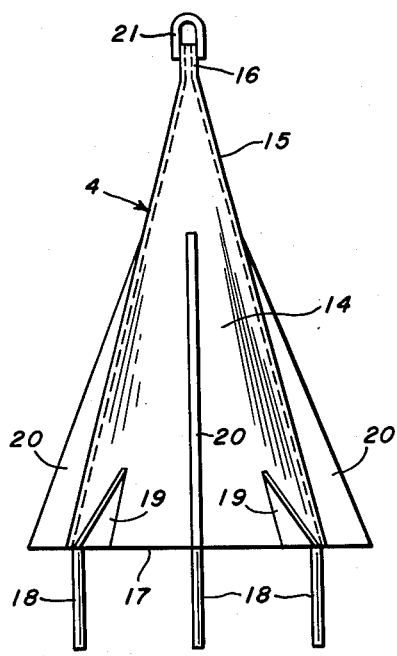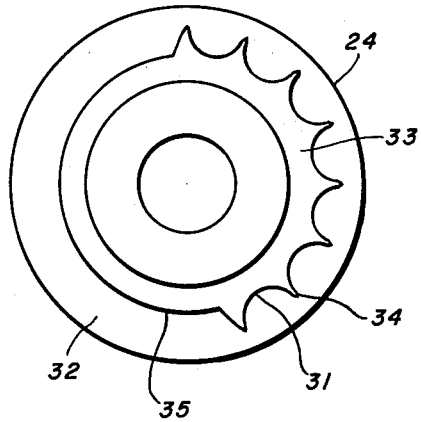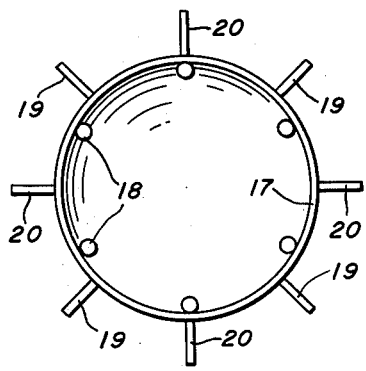

July 14, 1964  S. R. LANHAM  3,140,610
BIN LEVEL INDICATOR

Filed March 21, 1962  3 Sheets-Sheet 3

INVENTOR.
SHELBY R. LANHAM
By Donald G. Dalton
Attorney

United States Patent Office 3,140,610
Patented July 14, 1964

3,140,610
BIN LEVEL INDICATOR
Shelby R. Lanham, Gary, W.Va., assignor to United States Steel Corporation, a corporation of New Jersey
Filed Mar. 21, 1962, Ser. No. 181,344
3 Claims. (Cl. 73—321)

This invention relates to coal bins and the like and, more particularly, to an apparatus for determining the surface level or quantity of coal and other bulk materials in a supply bin.

Supply bins for coal and other bulk materials commonly have provision for intermittently or continuously charging and discharging the material therein, the operation of which under normal conditions causes the supply of material in the bin to vary over a wide range. Efficient control of the charging and discharging operations is dependent on knowledge of the quantity of material in the bin, and for this purpose apparatus that will furnish a continuous indication of the bin supply, especially at a remote location, is desirable. However, the characteristics of bulk solid materials such as coal render the problem of providing an apparatus that will furnish a continuous indication of this character troublesome, since available forms of volume and level indicators, such as those used to determine the level of liquids in tanks, will be buried and rendered ineffective when additions of the bulk material are made.

This invention accordingly has as one of its principal objects the provision of a bin level indicator for bulk solid materials such as coal, which is not affected by addition of the material to a supply bin. A further and related object of the invention is to provide a level sensing device or gaging member for bulk material supply bins and an operating mechanism therefor that both prevents its being buried by material charged into the bin and provides for its movement to a position supported on the surface of the material in which it furnishes an indication of the quantity of the material in the bin.

Other objects and advantages of the invention will become apparent from the following description.

In the drawings, there is shown a preferred embodiment of the invention. In this showing:

FIGURE 3 is an enlarged side elevational view of the surface level sensing device or gaging member that forms part of the apparatus shown in FIGURES 1 and 2;

FIGURE 4 is a bottom plan view of the gaging member shown in FIGURE 3;

Figure 1:
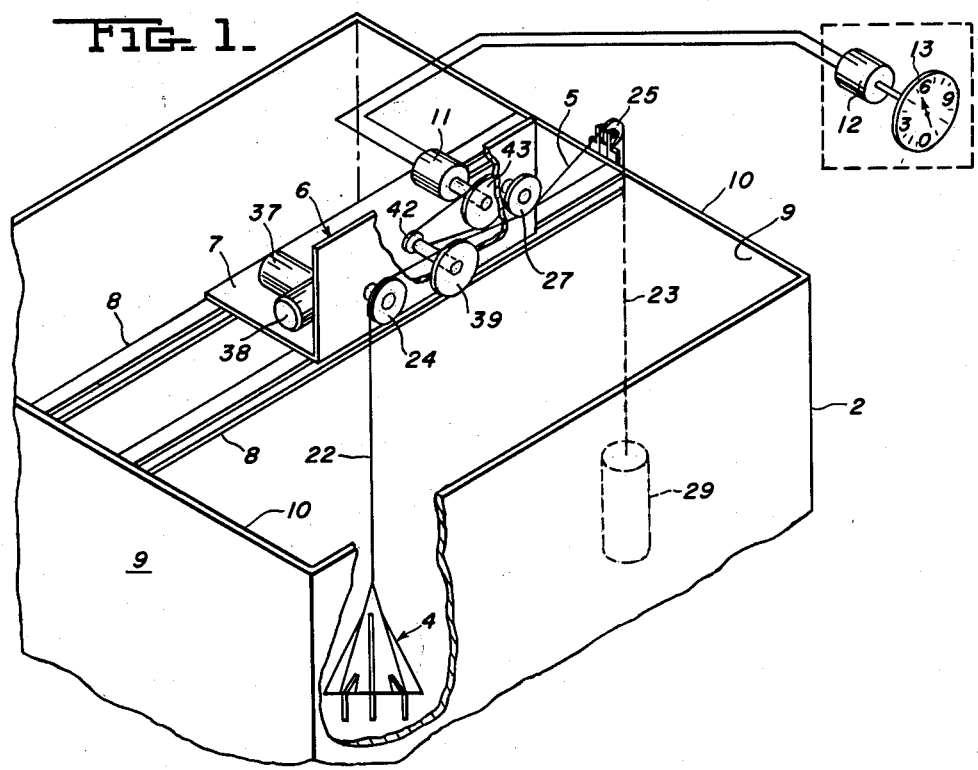
FIGURE 1 is a fragmentary perspective view showing somewhat diagrammatically the essential parts of the level determining apparatus of this invention and its application to a coal supply bin.
Figure 2:
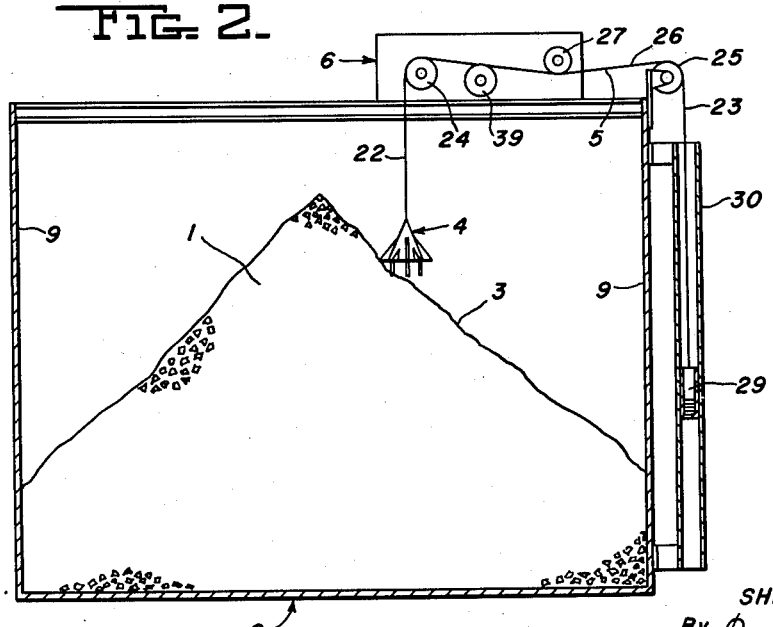
FIGURE 2 is a side view of the apparatus shown in FIGURE 1 in which parts including the bin are shown in transverse section.
Figure 5:
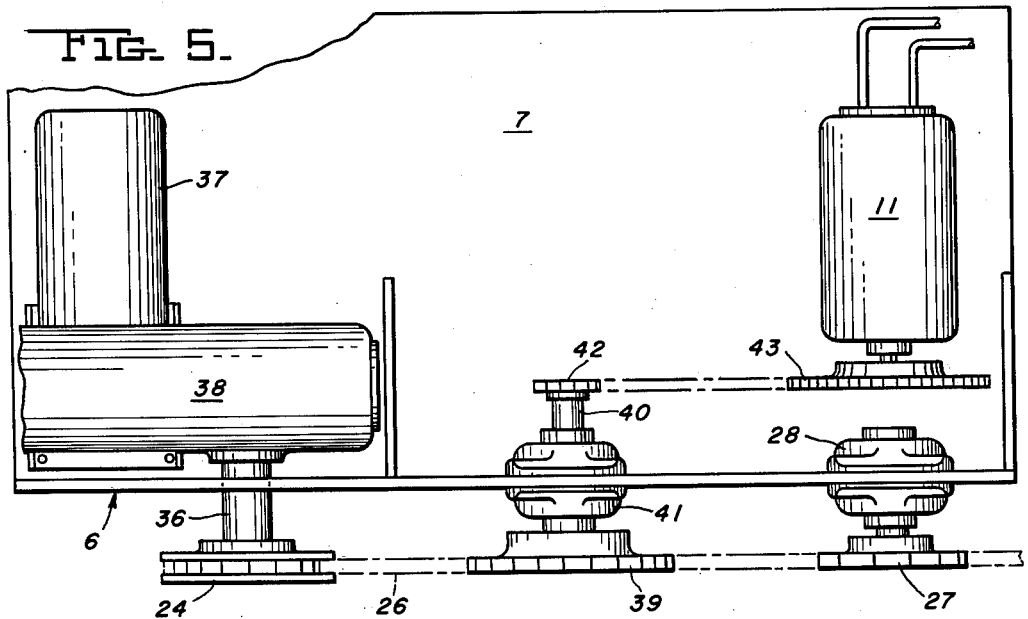
Figure 6:
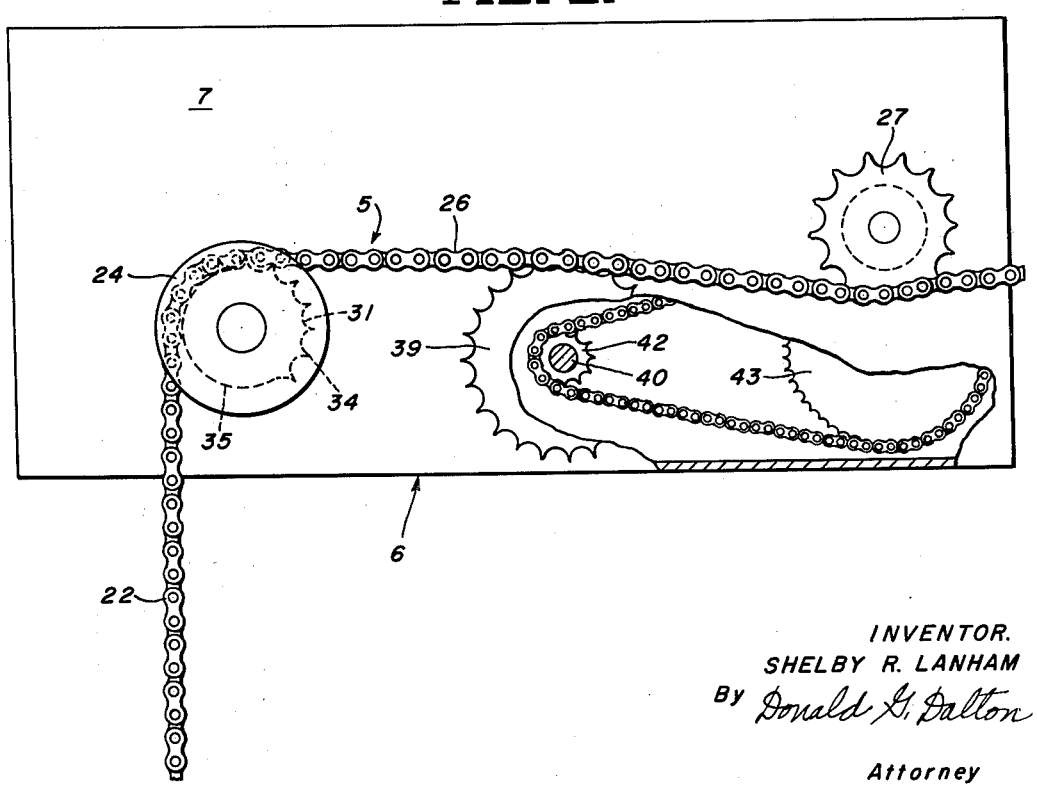

FIGURES 5 and 6 respectively are plan and side elevational views of a portion of the apparatus shown in FIGURES 1 and 2;

FIGURE 7 is a sectional view taken along a diameter of the drive sprocket wheel shown in FIGURES 5 and 6; and FIGURE 8 is a view taken substantially along the line VIII—VIII of FIGURE 7.

As indicated, the apparatus of this invention is particularly adapted for determining the level or quantity of coal 1 in a supply bin 2 of the type that is provided with conventional charging and discharging apparatus (not shown). The bin 2 is illustrated as having a rectangular shape and an open top through which coal or other bulk material is charged therein, for example, from a supply chute (not shown). While coal charged in the bin 2 in this manner will have a conical surface 3 as shown in FIGURE 2, the vertical level of any point on its surface will furnish an indication of the quantity of coal in the bin.

The apparatus of this invention comprises a gaging member or sensing device 4 for supporting engagement on the surface 3 of the coal 1 as shown in FIGURE 2, a counter-balanced sprocket chain 5 for operating the gaging member 4, and a unit 6 for actuating the chain 5 and transmitting an indication of the vertical position of the gaging member 4 in the bin 2 to a remote location. The unit 6 includes a bracket plate 7 by which it is supported on a pair of laterally spaced channels 8 that extend transversely of opposite sides 9 of the bin 2 and have their ends secured thereto adjacent the upper edges 10 thereof. In a manner to be described, the unit 6 further includes a transmitting element 11 that operates through a receiver element 12 at a remote location to actuate the dial of an indicator 13 to furnish an indication of the vertical position of the gaging member 4 in the bin 2 and thereby an indication of the quantity of coal 1 therein.

As shown in FIGURES 3 and 4, the gaging member 4 comprises a hollow metal shell 14 of pyramidal shape, preferably conical as illustrated in the drawings, that provides a downwardly sloping sidewall 15 between its upper end 16 and its lower end 17. A plurality of axially extending pins 18 are arranged at circumferentially spaced intervals about its lower edge 17 for anchoring engagement in the surface of the coal 1 when the member 4 is lowered by the chain 5 into supporting engagement therewith. Stabilizing fins 19 and 20 project radially outwardly from the outer surface 15 of the member 4 for distributing the flow of coal downwardly over the outer surface of its sidewall 15 when coal is charged in the bin 2. A bail 21 on its upper end 16 of the member 4 provides for its connection to the chain 5 as shown in FIGURES 1 and 2.

The chain 5 comprises vertical portions 22 and 23 at opposite ends thereof, which respectively extend downwardly from a drive sprocket 24 and an idler sprocket 25, and an intermediate portion 26 extending horizontally between the sprockets 24 and 25 and under a snub sprocket 27. Each of the sprockets 24 and 27 is rotatably supported on the bracket plate 7, the snub sprocket 27 being supported thereon by a bearing assembly 28, while the sprocket 25 is rotatably supported by a bracket on the bin wall 9. The gaging member 4 is suspended by the bail 21 from the lower end of the vertical portion 22 of the chain 5 within the bin 2. A counterweight 29 mounted loosely for free vertical movement in a guide 30 is attached to the lower end of the vertical chain portion 23 and furnishes a counter-balance for the weight of the gaging member 4 on the chain 5.

The drive sprocket 24 as shown in FIGURES 7 and 8 comprises a sprocket wheel 31 that is positioned centrally between axially spaced guide plates 32 that operate to guide movement of the chain 5 over the wheel 31. Only one-half 33 of the sprocket wheel 31 is provided with sprocket teeth 34 for meshing engagement with the chain 5, there being no sprocket teeth on the remaining half 35 thereof. The sprocket 24 is rotated continuously in a clockwise direction as viewed in the drawings at a low speed, preferably about 3 r.p.m., and for this purpose is keyed to a drive shaft 36 driven by an electric motor 37 and a gear speed reducing unit 38. As the sprocket teeth 34 move into meshing engagement with the chain 5 during rotation of the sprocket 24, the vertical portion 22 of the chain 5 is elevated a predetermined distance that is determined by the pitch of the teeth 34 and the chain 5 and by the number of teeth on the sprocket wheel 31. For a pitch of ¾ inch and a sprocket wheel 31 having eight teeth 34 as shown in the drawings, the chain 22 and gaging member 4 will be elevated 6 inches during each revolution of the sprocket 24. As the teeth 34 move out of meshing engagement with the chain 5, the chain moves into engagement with the portion 35 of the sprocket wheel 31 that does not have sprocket teeth and is thus freed to move downwardly to a position in which the gaging member 4 has supporting engagement on the surface 3 of the coal 1 as shown in FIGURE 2. The distance that the gaging member 4 travels downwardly in this manner is variable and is dependent on the vertical level of the point at which it engages the surface 3 of the coal 1 as shown in FIGURE 1. The vertical point at which the gaging member 4 comes to rest in this manner is also indicative of the quantity of coal 1 in the container 2.

As indicated above, the dial of the indicator 13 is operated to indicate the vertical movement of the gaging member 4 and thus the point at which it has supporting engagement on the surface 3 of the coal 1. The drive for operating the dial of the indicator 13 comprises the transmitter and receiver elements 11 and 12 mentioned above, and a driven sprocket wheel 39 mounted on one end of a shaft 40, which is rotatably supported on the bracket plate 7 by a bearing assembly 41. The other end of the shaft 40 operates a sprocket chain drive that includes a driving sprocket 42 on the shaft 40 and a driven sprocket 43 that operates the transmitter element 11. Since the sprocket wheel 39 has meshing engagement with the chain 5, the driven sprocket 43 and the transmitter element 11 are operated in accordance with the movement of the chain 5 and the vertical movement of the gaging member 4 in the bin 5. The gear ratio of the number of sprocket teeth 34 on the sprocket 24 and to the sprocket teeth on the sprocket wheel 39, and the gear ratio of the sprocket wheel 42 to the sprocket wheel 43 are designed in such manner that the sprocket wheel 43 and transmitter element 11 are rotated angularly through a little less than one revolution (about 324°) during vertical movement of the gaging member 4 between its upper and lower limits of travel in the bin 2. The transmitter element 11 and receiver element 12 are part of a conventional synchronous motion transmitting drive in which the receiver element 12 is electrically connected for synchronous rotation with the transmitter element 11 so that the angular position of the receiver element 12 thus always corresponds to the angular position of the transmitter element 11. Synchronous motion transmitting drives of this character are conventional and available on the market under the names of "Selsyn" and "Synchro-tie" systems. Since the elements 11 and 12 rotate through a little less than one revolution in response to movement of the gaging member 4 between its upper and lower limits of movement in the bin 2, the dial of the indicator 13 that is operated by the receiver element 12 can be calibrated to indicate either the vertical level of the member 4 in the bin 2 or the quantity of coal 1 therein.

If a sufficiently large quantity of coal is charged into the bin 2 to bury the gaging member 4, the drive for the chain 5 will operate in a short period of time to elevate the gaging member 4 to an operative gaging position. The continuous rotation of the sprocket wheel 24 as explained above operates to move the chain portion 22 of the gaging member 4 vertically upwardly a predetermined distance during each revolution thereof, and this upward movement of the gaging member 4 will be continued until the member 4 is above the surface 3 of the coal in the bin 2. Thereafter the chain drive will operate in a periodic manner to elevate and lower the gaging member 4 to its operative gaging position on the surface 3. This periodic elevating and lowering movement of the gaging member 4 will cause a pulsating movement of the dial of the indicator 13 between upper and lower limits, but by observing the lower reading of the indicator 13 the exact vertical position of the gaging member 4 and thereby the quantity of coal in the bin 2 can be determined.

While one embodiment of my invention has been shown and described it will be apparent that other adaptations and modifications may be made without departing from the scope of the following claims.

I claim:
1. Apparatus for determining the level of bulk material in a bin comprising a gaging member arranged in said bin for supporting engagement on said material, said gaging member being in the form of a conically-shaped metal shell, a vertically extending sprocket chain having a connection at its lower end with the upper end of said shell, a sprocket wheel having sprocket teeth about only a portion of its periphery for meshing engagement with said chain, means for rotating said wheel to render said sprocket teeth effective during each revolution thereof to elevate said chain a fixed distance in said bin, said chain being released upon movement of said teeth out of meshing engagement therewith for downward movement of said gaging member a variable distance determined by the surface level of the material in said bin to a gaging position supported on its said surface, a plurality of anchoring pins at circumferentially spaced points about the base of said shell and extending axially downwardly for anchoring engagement in the material in said bin, and means responsive to vertical movement of said gaging member for determining its vertical position in said bin and thereby the surface level of the material therein.

2. Apparatus for determining the level of bulk material in a bin comprising a gaging member arranged in said bin for supporting engagement on said material, a vertically extending sprocket chain having a connection at its lower end with said gaging member, a sprocket wheel having sprocket teeth about only a portion of its periphery for meshing engagement with said chain, means for rotating said wheel to render said sprocket teeth effective during each revolution thereof to elevate said chain a fixed distance in said bin, said chain being released upon movement of said teeth out of meshing engagement therewith for downward movement of said gaging member a variable distance determined by the surface level of the material in said bin to a gaging position supported on its said surface, and means responsive to vertical movement of said gaging member for determining its vertical position in said bin and thereby the surface level of the material therein.

3. In a chain and sprocket drive, the combination with a chain having a bias for movement in one direction, of means operable for moving said chain intermittently in an opposite direction against the action of its said bias comprising a sprocket wheel having sprocket teeth about only a portion of its periphery for meshing engagement with said chain, means for rotating said wheel to render said sprocket teeth effective during each revolution thereof to move said chain a fixed distance in said opposite direction, said chain being released upon movement of said teeth out of meshing engagement therewith for movement by its said bias in said one direction.

References Cited in the file of this patent
UNITED STATES PATENTS

| 1,760,204 | Mittendorf | May 27, 1930 |
| 1,851,195 | Leilich | Mar. 29, 1932 |
| 2,704,401 | Mohr | Mar. 22, 1955 |
| 2,854,752 | Heacock | Oct. 7, 1958 |